Oct. 23, 1962  E. J. SHUFTAN  3,059,525
PHOTOCOMPOSITION SYSTEMS
Filed April 21, 1958  3 Sheets-Sheet 1

INVENTOR
EUGEN J. SHUFTAN
BY
ATTORNEY

Oct. 23, 1962  E. J. SHUFTAN  3,059,525
PHOTOCOMPOSITION SYSTEMS
Filed April 21, 1958  3 Sheets-Sheet 2

INVENTOR.
EUGEN J. SHUFTAN
BY

Oct. 23, 1962  E. J. SHUFTAN  3,059,525
PHOTOCOMPOSITION SYSTEMS
Filed April 21, 1958  3 Sheets-Sheet 3

INVENTOR.
EUGEN J. SHUFTAN
BY 3,059,525
PHOTOCOMPOSITION SYSTEMS
Eugen Julius Shuftan, 115 W. 71st St., New York, N.Y.
Filed Apr. 21, 1958, Ser. No. 729,988
Claims priority, application Germany Aug. 9, 1957
11 Claims. (Cl. 88—16)

This invention relates to photocomposition systems and processes especially for the manufacture of still photography, motion and television pictures in which a main picture component such as live action is combined with supplementary picture components such as background scenery derived from transparencies projected on reflecting or semi-transmissive surfaces.

This application is a continuation-in-part of my application Serial No. 445,750, filed July 26, 1954, now Patent No. 2,857,806.

One of the objects of the invention is to derive the live action through a transparent cutout in a reflecting surface arranged in front of a camera while the supplementary component pictures are directed from one side only from the reflecting parts of the surface into the camera.

Another object of the invention is to direct the component light beams from one side only on to the back of a semitransparent background screen and to photograph or televise the live action occurring in front of such screen together with the back-ground pictures into a camera which is not exposed to the directly transmitted portions of the background light beams.

It is known from trick film technique to replace part of the decorations by models of reduced scale, for example to provide scenery of superhuman dimensions.

These models are arranged between camera and actors in such a way as to achieve the desired dimensional relationship between live action and background. Under the name of Shuftan process, furthermore, a composite photographic process is known in which the reduced background models are replaced by transparencies reflected from a mirror having a transparent cutout through which main background and actors are photographed. Both processes have the disadvantage that it is difficult to achieve a perfect juxtaposition of the component pictures without the showing of separation lines. Focusing in depth is also difficult and can only be solved with the aid of an extremely intensive illumination. For example, a reduction in scale of the auxiliary component pictures of 1:4, requires at a distance of thirty foot from the main background from the camera, a focal depth of between 7.5 and thirty feet. Such focal depth can only be realized at excessively reduced camera openings, such as a shutter opening of 22, which in turn will require very large illumination intensities.

A further disadvantage of the known process is in that small displacements or vibrations of the mirror will automatically destroy the perfect line-free juxtaposition of the different component pictures. While attempts have been made to improve these conditions by specific photographic techniques, for example by the insertion of color or gray wedges and corresponding adjustments of color, these techniques have been found suitable for black and white pictures only, but not for color pictures.

One of the objects of the invention, therefore, is to overcome these difficulties by adjusting in the camera the main component picture in sharp focus and to move the mirror so close to the camera that the circle of diffusion for the auxiliary component pictures is between 1 and 5 mm., whether this circle of diffusion is calculated from shutter stop, distance and focal length of the objective of an optical point, or it is measured on the camera screen as a mirror point of less than .01 mm. diameter. At the same time, unilaterally of the mirror and at a short distance therefrom, a collector lens or an equivalent optical element is arranged in the path of the supplementary component pictures in such a manner that these pictures will be photographed by the camera at the given distance adjustment thereof.

In a preferred embodiment of the invention, the mirror is arranged at such a distance from the camera that the diameters of the diffusion circles of points reflected from the mirror are between .5 and 2 mm.

In order to achieve this purpose, as a more specific object of this invention, the camera is focused sharply upon a main projection screen consisting preferably of a grain-free rubber, collodium, or plastic foil. On this projection screen the desired still or moving pictures are projected sharply, preferably by means of background projection technique. The same picture is also directed upon the mirror from one side only so that the pictures will superimpose each other, within the measure of the desired unsharpness and without separation lines being visible.

It is another object of the invention to arrange one or more background projectors behind the projection screen and in this case either right or left when viewed from the camera. The mirror or any reflecting surface can be supported rotatable about its axis to correct its oblique position with respect to the projected pictures.

In accordance with another object of the invention, the mirror or reflecting surface is arranged in a zone in which the mirror itself and thereby the edges of its cut out portion are being seen by the camera with well defined values of the circle of diffusion.

In the known processes, such an arrangement of the mirror would deteriorate the picture quality because as a result of their unsharpness, the pictures could be brought only insufficiently into proper juxtaposition upon the mirror, especially if observation on an opal screen is excluded as is usually the case in motion picture or television productions.

A specific object of the invention is in that the same complete picture or at least a substantial part thereof, is projected from one side only upon the mirror as well as the main projection screen.

In another embodiment of the invention auxiliary cameras are added for close-ups or like special effects, which can be switched in or switched out as desired. These cameras may already be arranged within the normal picture range of the main camera, all that is necessary for effective operation is to so place them that they do not fall within the cutout portion of the mirror.

In a preferred embodiment of the invention, a mirror is used which reflects on both sides thereof; on the side of the mirror facing the projector for the supplementary picture components, an auxiliary camera is arranged or a monitoring device or viewer, preferably with the interposition of a further mirror or like means reversing the sides of the picture.

Still another object of the invention is to arrange on both sides of the optical axis of the main camera a projector in such a manner that the optical axes of the projectors intersect on the mirror with the point of intersection of the optical axis of the camera.

A further object of the invention for background projection is to arrange the projectors on one (left or right) side only on the back of a semi-transparent screen and the camera in front of such screen, and on the same (left or right) side as the projectors thereby preventing the camera from being exposed to hot spots derived from projector light directly impinging upon the camera lens.

In order to reduce, if not compensate, distortion due to this uni-laterally projecting light beam, the transparencies used for projection are distorted in such a way so that in projection on the screen and exposure to the camera an undistorted picture of the background will result.

As a further alternative, compensation of projection distortion is effected by appropriately shaped projection lenses or any other optical reflecting or deflecting means causing the transparencies used for projection to be distorted or their distortion to be compensated with the result that on the background screen an undistorted picture will appear which is exposed to the camera.

As a further object of the invention and in the case of several projectors being provided on the back of the screen, the overlapping of adjoining projecting light beams is reduced or made unnoticeable by causing the adjoining transparencies to provide gradually diminishing transparencies at the points of overlap.

Alternatively, such overlap is minimized or corrected by providing in the path of the light beam but next to the transparencies, preferably in engagement therewith or closely adjoining it, light intensity reducing wedges which cause a continuous transition on the background screen from one transparency picture to another.

These and other objects of the invention as will be more fully apparent from the drawings annexed in which FIG. 1 shows a top view upon a photocomposition system embodying certain features of the invention.

Figure 1:
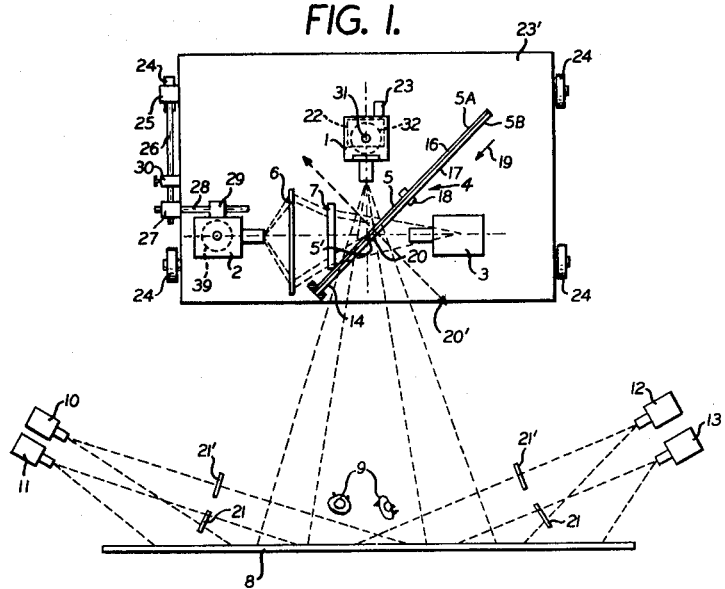

As apparent from FIG. 1, camera 1 is arranged at any desired distance in front of a main projection screen 8. In contrast to the known processes, the optical adjustment of camera 1 is completely free and may be adapted to any existing conditions. Objectives of any desired focus can be selected. The shutter opening is also freely selected, i.e., large openings may be used. Generally, the distance is so chosen that actors 9 in their range of movement is projected sharply unless for pictorial reasons the decorations or props are desired to be unsharp. The shutter adjustment is adapted to the light density on projection screen 8. Projector 2 is arranged on one side of camera 1, and preferably cooperates by way of background projection with the relatively small auxiliary projection screen. An auxiliary projector 3, a projection lamp, an auxiliary camera, or a viewer may be arranged opposite projector 2.

Camera 1 is a photographic still camera, a motion picture camera, or a television camera. Projector 2 can be used for the projection of motion pictures, for example, substandard films, or of still pictures.

In the optical range of camera 1, there is arranged an optical reflecting system 4 which is covered partially with a fully or at least partially reflecting layer 5. Preferably system 4 consists of several slide mounts 16 and 17 to carry partially or fully semi-transparent mirrors, fully intransparent mirrors, or semitransparent observation screens in exchangeable positions. The slide mounts are arranged at such an angle to camera 1, for example 45°, that the optical axis of camera 1 and the optical axis or projector 2 intersect each other upon the mirror with the same angle of incidence.

In case a fully intransparent mirror is inserted, the semitransparent observation screen of camera 1 will only show the picture of supplementary projection screen 6 formed by lens 7. Lens 7 is preferably arranged very close to mirror 4 so that its diameter can be held within reasonable limits and optical projection errors be reduced to a minimum. Position and focal length of lens 7 are so chosen that the picture of projection screen 6 appears sharply upon the observation screen of camera 1 as soon as camera 1 is focused sharply upon main projection screen 8. The distance of mirror device 4 is so chosen that an imaginary point arranged at the intersection point of the optical axis of camera 1 with mirror device 4, or a tiny control point on the mirror, will appear on the observation screen of camera 1 with a diameter of more than 1 mm. and less than 5 mm.

The mirror is provided, on the lateral edges of the optical range of camera 1, with control points of very small diameter which should preferably be projected into the camera screen with diffusion circles of .5 to 2 mm. whereby the largest diameter of the circle of unsharpness should correspond to the point of the mirror closest to the camera while the smallest diameter should correspond to the point of the mirror farthest from the camera.

It is very important to observe these conditions because only in this manner the above mentioned independency of operation in production technique is realized.

In front of projection screen 8 or better—in the sense of the arrangement of camera 1—behind projection screen 8, main projectors 10, 11, 12, 13 are arranged which produce the same picture on a greater part of main projection screen 8 as projector 2 on auxiliary projection screen 6. The overlapping areas of projectors 10, 11, 12, 13 are covered by mask 21. In the oblique arrangement shown of projectors 10 to 13, it is, of course, necessary to project relatively distorted pictures in order to cause these pictures to appear relatively undistorted on projection screen 8.

In the reflection system 4, reflecting layer 5 is arranged preferably upon a glass plate 14 on the side towards camera 1. Reflecting layer 5 is scratched out at an irregular portion 5' so that at this portion the glass plate is completely transparent. Within this transparent portion, the camera takes the picture of main projection screen 8 and actors 9 moving in front of this projector screen, and furthermore, if necessary, additional props and decorations while outside of this portion, the picture derived from auxiliary projection screen 6 is taken by the camera.

Figure 2:
FIG. 2 shows schematically an example of a picture made in accordance with the invention.

Since the picture on screen 6 in accordance with the invention coincides completely with the picture on main screen 8 if the various pictures are adequately adjusted, no change will occur when the mirror is moved to and fro or when its cutout is changed. Actors 9 therefore have complete freedom of movement. It is only necessary to take care that camera 1 sees the actors completely through the scratched out portion of the mirror. If necessary, the movement of the actors can be followed by a corresponding displacement of the mirror. The pictures projected on screens 6 and 8 can be moving pictures, for example, street scenes with walking persons and moving vehicles. In the picture shown in FIG. 2 the two persons in front are actors which were on the stage at the moment of the taking of the pictures while the persons and the automobiles behind have been taken previously during the taking of the film projected by means of projectors 2 and 10 to 13.

The upper part of the two persons on the right hand background is derived at the moment of camera exposure from auxiliary projection screen 6 while the lower part is derived from main projection screen 8.

In case the above mentioned optical conditions and the arrangements of the mirror are maintained, the transitions between the different pictures are so fluid that even an experienced eye will not find any separation line. In view of the fact that the transition line 5' during production can be continuously changed by displacement of the mirror, this separation line is even less noticeable when looking at the finished film because it travels over the picture. As soon as actors 9 go off the stage, other persons who have been photographed previously can be taken by camera 1, for example extras. In this manner, changes in scenery are considerably enhanced because for example the finished film or a television show does not need to contain still pictures. During the change in scenery the mirror may be replaced with another mirror of different scratched-off portions, for example, one which is more suitable for a closeup.

In accordance with the above, the projection of a film can be made to occur step-wise which may result in considerable economy. The cameraman for example may first be employed almost completely to turn a film without using the main actors. This is especially important where the individual scenes of the film take place in different and distant parts of the world for example in different continents. The film thus manufactured will then be printed and if necessary otherwise treated so that the corresponding film strips result for projectors 2 as well as 10–13 which then form the same pictures on the auxiliary screen 6 and the main projection screen 8. The final films will then be manufactured exclusively at the studios in accordance with the process described above by means of a camera 1, and only then the main actors will have to come into play.

During the preparatory work, of course, the corresponding mirrors are manufactured, the ranges of movement for actors 9 established and the light values on projection screens 8 and 6 accurately adjusted.

In this way the main actors are enabled to play several scenes in succession, independently of the decorations required for the different scenes, which facilitates their work considerably.

In a similar manner television transmission and in particular live shows are carried out. The insertion of trick effects is facilitated. Thus, for example, it is possible by a displacement of the mirror to make actors disappear from or enter an open stage.

The adjustment of the camera is not subjected to any restriction as long as its position with respect to projection screen 8 is unchanged. In camera 1, mirror 4; and projector 2 are arranged on a fixed base plate as shown in FIG. 1, this base plate can be moved to and fro, for example, by means of rollers 4 in fixed rails with respect to main projection screen 8.

Obviously in such displacement of camera 1, on platform 23, care must be taken that projector 2 always projects the same picture on auxiliary projection screen 6 as is covered by camera 1 on main projection screen 8. If, therefore, platform 23 is moved towards main projection screen 8, projector 2 must also be moved closer to auxiliary projection screen 6. At the same time the focal adjustment of projector 2 must be readjusted. This can be achieved by hand, by the camera assistant, especially if during rehearsal the corresponding adjustment values of projector 2 have been previously established.

Such readjustment also in accordance with the invention can also be achieved automatically by means of a control device as schematically indicated in FIG. 1.

For this purpose projector 2 is clamped to rail 28 by means of an adjustable sleeve 9, which is displaceable along a guide 27. The movement of a wheel 24 of platform 23 is then transferred through a transmission linkage 25–27 to rail 28. This transmission linkage is adjustable by means of a displaceable sleeve 30 to different transmission ratios. In addition (not shown) a curve control mechanism, for example a finger with a contact bolt or plate having a slot guiding a bolt, is so inserted in the transmission path that a corresponding adjustment of the movement of projector 2 relative to the longitudinal displacement of camera 1 is achieved. The shape of the finger, the form of slot of the curve control mechanism, are empirically fixed in the following manner:

Platform 23 is stepwise—by steps of one and a half feet to two and a half feet, respectively—displaced in the direction of main projection screen 8 whereby with the aid of a test picture the corresponding adjustment is accomplished. The corresponding displacement values of projector 2 are then determined and evaluated for the manufacture of the curve. Obviously when changing the camera objective, the curvature of the curve control mechanism must also be changed. Furthermore, the focusing of projector 2 can be controlled by a finger schematically indicated at 39 which is also positively coupled with the displacement of projector 2. It is, however, more advantageous to hold camera 1 more or less fixed with respect to projection screen 8 and to use, for example for closeups, objectives of larger focal lengths unless it is preferred to take these closeups separately with the aid of auxiliary cameras.

Arrangement 3, shown in FIG. 1, for example, can be a projection lamp which illuminates with white or colored light the unscratched portion of the mirror as well as the stage and projection screen 8. In this way, in a simple way and manner, the range can be fixed in which actors 9 may not enter unless they are to disappear from the range of the picture exposed in camera 1. In addition, if necessary in this way the transition zones marked by line 5' can be clearly defined, especially if between the transparent range of the mirror mask and the reflecting range of the mirror mask a more or less wide semitransparent transition line is provided.

Device 3 can also be a projector which serves for example before taking, to take test points or test strips upon the mirror to facilitate adjustment.

In television transmission, the optical device 3 may consist of an auxiliary camera. This camera sees the picture exactly reversed with respect to the main camera 1, i.e. it receives the picture of projection screen 6 through the transparent cutout while the reflecting parts of the mirror receive the picture of projection screen 8 and actors 9. In this way by switching over to camera 3, especially in television productions, fadeouts and fadeovers can be effected whereby then the mirror mask temporarily may be exchanged against the full reflecting mirror so that actors 9 have the full range of the stage at their disposal. Then, however, the actors will not be anymore in the picture or between the decorations but in front of the scenery or the projected picture. Since camera 3 sees the picture side-reversed as a result of the mirrored reflection, it may be useful in many cases to arrange a further mirror in front of camera 3. Preferably, however, device 3 is in the form of a viewer which has the advantage that it permits a continuous control of the taken picture during production.

In order to facilitate the realization of the invention, the following example describes a complete production including preparations. It is, of course, possible to omit certain preparatory steps depending upon the requirements on the specific production.

*Example*

A television play was prepared by manufacturing a series of still pictures for example landscapes, buildings, or pictures of small specially made models. Furthermore, film strips were made of movie scenes with or without extras without involving any main actors. From this material appropriate prints were made for main projectors 10 to 13. It is naturally not necessary to use four main projectors 10 to 13, as shown in FIG. 1. Often a single projector is sufficient, arranged behind main projection screen 8 to produce by way of background projection a sharp picture. Here however we have the disadvantage of the so-called hotspot, i.e., the light spot derived from the direct projection of the light source on to the projection screen. Such hotspots must be covered by masks. If necessary to cutout in mirror mask 4 is so selected that the hotspot is not exposed to the camera. This is feasible in accordance with the invention because, as already stated above, complete freedom exists in selection and arrangement of the mirror cutout. In view of the fact that space in film studios, and especially television studios, is rather limited and since large screen productions require very wide studio spaces, generally, the oblique arrangement of main projectors 10–13, as shown in FIG. 1, or, wherever possible, background projection is preferred. The areas of overlap of the projectors are covered by means of shutters 21, 21', arranged like the mirror in unsharp zones. As the result of the oblique arrangement of the projector or projectors, the light intensities at screen points closer to the projector are higher. This is compensated in accordance with the invention by placing in front of the projector, a gray wedge which has the greatest intransparency at the side close to the screen and which is fully transparent on the side away from the screen.

Unless already during printing the corresponding still photos or film strips have been made for auxiliary projector 2, these strips could also be made after adjustment of the main projectors by taking these pictures by means of camera 1 in the absence of actors 9. This has the further advantage that a complete coincidence of the pictures is assured. From these still fotos of film strips normal prints for projector 2 and mirror-reversed prints for projector 3 are manufactured.

As has been found in practice, projector 3 facilitates rapid adjustment of scenes. This projector could also be used in place of camera 1. It is then difficult to readjust camera 1 accordingly. Projector 3 serves to provide a sharp and clear adjustment although mirror 4 in accordance with the invention is arranged in a zone in which the unsharpness of the picture on mirror 4 would already cause difficulties in adjustment. In detail the adjustment takes place in the following manner:

Mirror mast 4 will be replaced by a fully reflecting mirror inserted in one of the slide rails 16 or 17. Projector 3 projects the mirror-reversed picture through mirror 4 on main projection screen 8. Projectors 10 to 13 are inserted whereby it is now necessary that the two pictures coincide on main projection screen 8. If necessary, further corrections can be made by displacement of projectors 10 to 13. If projectors are used on one side only, for example, either projectors 10 or 11, or 12 and 13, or if the projection screen 8 is illuminated obliquely from above over the heads of actors 9, then it is possible for improvement of the adjustment to rotate the screen somewhat about a horizontal axis or aline it about a vertical axis. Now the cutout on the mirror is established. The scratch line 5', on the one hand, should not run along a regular straight line, otherwise there is a danger that the separation lines will become visible. It should also not be too irregular because it would be difficult to make it up in a precise manner and precisely to fix the accurate range for the actors 9. It has been found best to use in practice a scratch line 5' which consists approximately of quarter circles of opposite curvature arranged in a longitudinal array approximately following the scheme of antique gothic, cross-bow ornaments.

The mirror is now replaced through a semitransparent screen whereby the picture of projector 2 is so adjusted upon the picture of projector 3 appearing upon the transparent screen that the two pictures coincide.

If necessary the adjustment can be facilitated by tiny control points upon the diapositives or film strips used for projection.

Now the semitransparent screen is replaced by a mirror inserted in one of the rails 16 or 17 whereby the exposure by camera 1 occurs simultaneously with that of the main actors 9. During exposure, as stated above, several scenes, or for example in television technique a complete half-hour program, can be completed without interruption; at any time scenes may be exchanged by inserting a fully reflecting mirror in one of the rails 16 or 17.

If necessary, it is also feasible to switch over to an auxiliary camera arranged for example laterally. Naturally, it is also feasible to arrange between the mirror and the main projection screen an optical system for example a diffusion lens. The mirror can then be arranged swingable and rotatable.

It is also feasible, without departing from the scope of this invention, to cause everything which has been described above as passing through the cut out portions of the mirror to pass over the reflecting portions thereof, and conversely.

It is further feasible to focus the picture sharply upon portions of the projection surface closest to the camera axis and to use a lens system to adjust the sharpness of distance to more distant objects. Such lens system can also be arranged below the mirror in its cutout.

In this way the photocomposition process becomes substantially independent of position and magnitude of the cutout on the mirror, which can be changed during production. Thus, for example, it becomes possible without being noticeable in the finished photograph to displace the mirror during production, to track an actor with a cutout of varying size and position, or to displace the zone of transition between the different component pictures into relatively less noticeable areas.

For the purpose of making trick pictures, as an additional object of the invention, the mirror can be so displaced as to cause during production one of the actors to disappear from the picture.

Similarly, the scenery can be changed during production and with the camera being in full operation and, for this purpose, an intransparent mirror is inserted behind the mirror causing the camera to continue receiving the full picture from the projection device arranged on side thereof. Then the cutout mirror may be replaced by another cutout mirror adapted to another scenery, whereupon the intransparent mirror is withdrawn so that the cutout of the new cutout mirror becomes again exposed.

This independence in production technique has particular advantage in television and, for example, in the production of live shows, i.e., shows transmitted without the interposition of films because, in this case, the show does not have to be interrupted for change in scenery or adjustment.

For adjustment, the complete but mirror-reversed picture is projected through one of the projectors by means of a full non-cut mirror upon the main projection screen. Thereafter the projectors for the main projection screen are adjusted on this picture until a desired juxtaposition and light homogeneity are reached. Now the cutout on the mirror is determined and thereafter the mirror replaced, preferably by means of a semi-transparent screen, to adjust the picture of the other projector with respect to the picture of the first projector appearing on the semi-transparent screen. Finally, the semi-transparent screen is replaced by the cutout mirror and production started.

Figure 3:
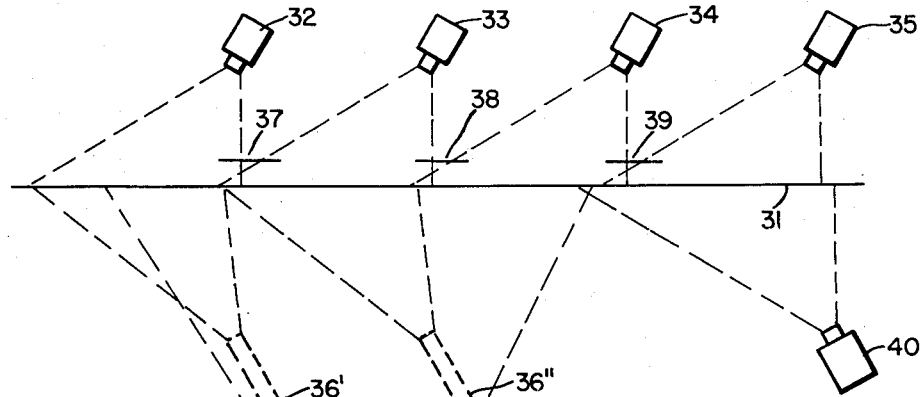
FIG. 3 illustrates the invention as applied to background projection with a number of projectors arranged obliquely on one side of the background screen.

In FIG. 3 a projection screen 31 is dispersed between a number of projectors 32, 33, 34 and 35 arranged obliquely on the back of the screen with respect to a camera 36 arranged in front of the screen 31 and as shown in dotted line in positions 36' and 36" adjusted not to be exposed to the direct light of any of projectors 32 to 35.

Distortions caused by the angular position of projectors 32 to 35 are compensated for either by the use of distorted transparency slides or distorting projection lenses in projectors 32 to 35, or by an oblique position of the transparency slides in projectors 32 to 35.

At the same time, by using several projectors as shown in FIG. 3 covering relatively small sectors of screen 31, only the distortions of the individual sector can be reduced to a minimum.

In positions schematically indicated at 37, 38 and 39, gray wedges are arranged to reduce separation lines to a minimum between adjacent pictures, thus causing a smooth transition from one light beam to an adjacent one. Other projectors may be added as shown schematically at 40 in front of the screen so as to provide additional illumination, for example, for the actors playing in front of screen 31.

Figure 4:
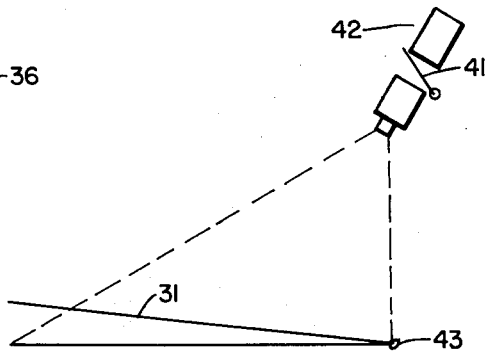
FIG. 4 shows a modification of FIG. 3 with adjustments to reduce or compensate distortion.

In FIG. 4 the projection transferences corresponding to the background are shown to be distorted previously by an oblique arrangement of slide 41 in projector 42. Additional distortion or distortion compensation can be provided by adjusting or turning projection screen 31 around a vertical axis schematically indicated at 43.

Figure 5:
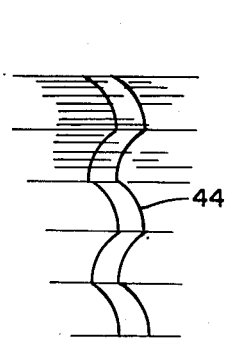
FIG. 5 shows a specific gray wedge to cause transition of adjacent projecting beams.

FIG. 5 shows a specific mask or gray wedge to facilitate transition from one transparency to an adjacent one or from one light beam to an adjacent light beam. This mask does not represent a sharp black and white configuration but rather an unsharp wavy form in the general form of a longitudinal array of quarter-circles or sectors of opposite curvature of increasing transparency from one side to the other of the line shown in FIG. 5.

Figure 6:
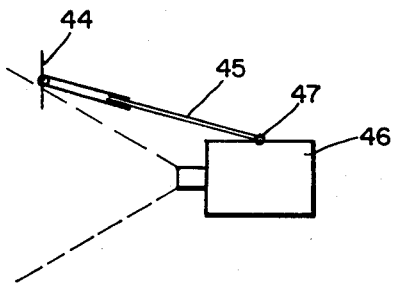
FIG. 6 shows the mounting of such a gray wedge and FIG. 7 a modification of FIG. 6.

FIG. 6 shows a practical support of such a mask 44 on a telescopic arm 45 attached to projector 46 on a universal hinge 47. This arrangement permits mask 44 to be adjusted not only longitudinally but also turnable to any desired angular direction to adjust the transition effects between adjacent intersecting lighting to a minimum.

Figure 7:
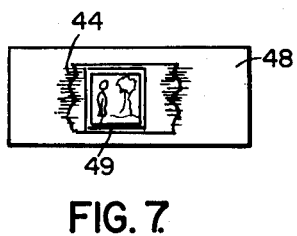
Figures 8, 12:
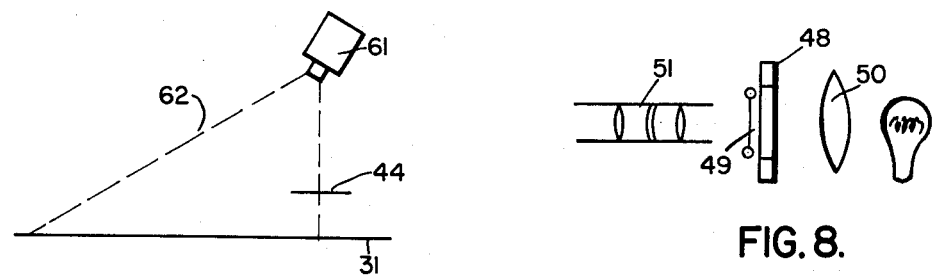
FIG. 8 represents a side view of FIG. 7.

Transition compensation can also be effected, instead of outside of the projector, within the projector itself, as shown for example in FIGS. 7 and 8 where a frame 48 carrying one or two wedges of the type shown in FIG. 5 at 44 and movable with respect to the slide shown in FIG. 7 in dotted line at 49.

Frame 48 may be movable not only in longitudinal but also in a perpendicular direction for transition adjustment.

FIG. 8 shows a corresponding side view of FIG. 7 in which the wedge carrying frame 48 is arranged close but at a predetermined distance from transparency slide 49 and in an unsharp zone between transparency slide 49 and condenser 50, on the side way from objective 51.

A wedge such as shown at 44 can be manufactured in any known manner but in accordance with the invention it should have as little grain as possible in order to make its effect inconspicuous as possible. For this reason, the wedge pattern is photographed from a sharp picture of the pattern arranged in an unsharp zone and on a color photographic emulsion of very fine grain, and then only the yellow picture is developed. After development, the yellow emulsion is dyed with a gray dye or is printed on a low-grain black and white emulsion thereby producing the desired gradual density effect with a minimum of loss in light density.

Distortion compensation can be effected in any known manner, preferably on the picture itself which is taken or printed in a distorted way and when projected on the background screen appears in the right proportions. Another way of providing distortion is to adjust the slide as stated before obliquely in the projector. Still another way is to provide a distorting projecting lens.

Figures 9, 10:
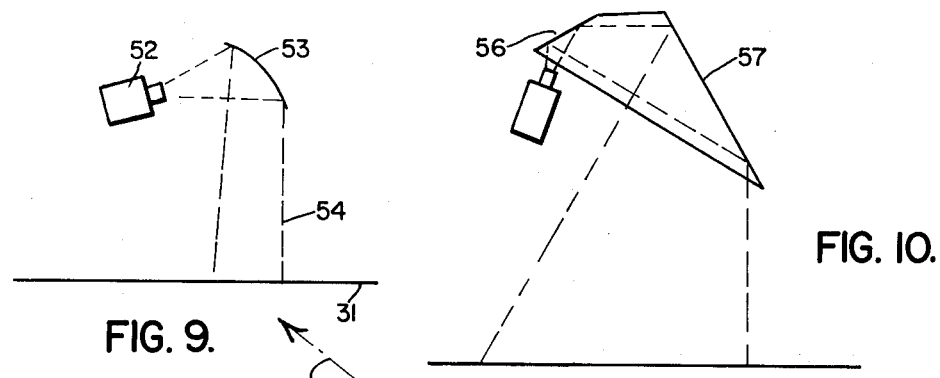
FIG. 9 shows a projection arrangement involving a distortion reducing and light deviating mirror.
FIG. 10 is a modification of FIG. 9 involving two light deviating mirrors forming part of a prism.

FIG. 9 illustrates a way of providing distortion together with light deflection in accordance with the invention while preventing the occurrence of direct incidence of light on the camera objective.

In FIG. 9 the light from projector 52 is shown to be passed over a distorting mirror 53 which compensates the distortion caused by the oblique incidence of light beam 54 on background screen 31. Direction of the camera axis is indicated by arrow 55.

In FIG. 10, light deflection is caused by two mirrors which may be combined into a prism, as schematically indicated in FIG. 10 at 56, 57, and which serve to deflect the light beam from direct incidence upon the camera of which the optical axis is schematically indicated at 58.

Figure 11:
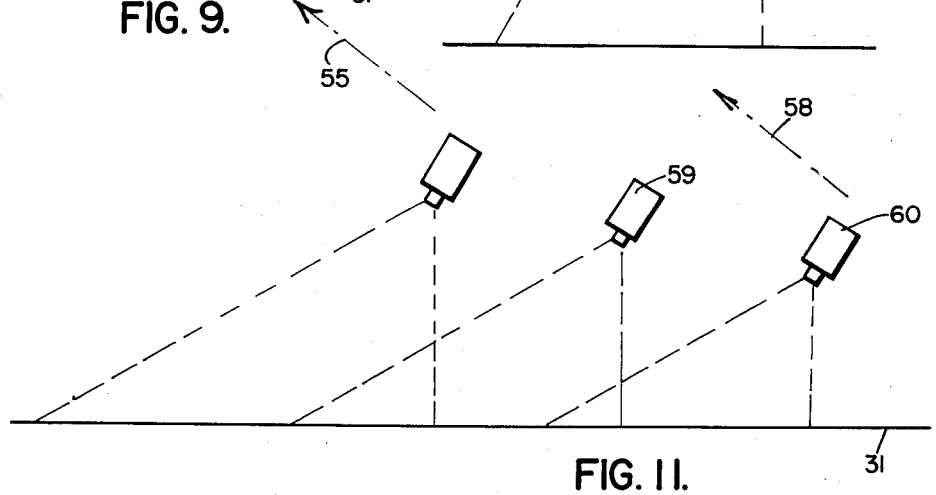
FIG. 11 shows a distortion reducing projection arrangement and FIG. 12 an arrangement for compensating unequal illumination of the background screen.

FIG. 11 shows the disposition of a number of projectors in a step-wise arrangement with varying distances from screen 31 as schematically indicated at 58, 59 and 60. Such arrangements may also serve to equalize screen illumination and also to reduce distortion by reducing the size of the different background products to a minimum.

FIG. 12 shows compensation of inequalities in illumination caused by the oblique arrangement of a projector 61 with respect to a background screen 31, by means of a gray wedge similar to that indicated by FIG. 5 at 44 and arranged to reduce the light intensity of the shorter leg of light beam 62.

In a specific embodiment in accordance with the invention, the projector or projectors used for background projection on the back of the screen need not be placed unilaterally with respect to the axis of the screen but may be positioned at any desired location on the back of the screen.

In this case, all that is necessary for the purpose of the invention is to provide in the light path of these projectors, optical light reflecting or deflecting means which cause the projecting light beam or beams to impinge the background screen at an angle generally of less than 90° with respect to the optical axis of the camera lens or in any case at such an angle that the camera is substantially not hit directly by the light beam or light beams intersecting with the screen. Such light deflecting means may also seem to distort and, therefore, to compensate the distortion due to the unilateral oblique arrangement of the background projectors with respect to the screen.

The invention is not limited to the distorting, compensating, deflecting and equalizing means nor to the arrangement of projectors, screen and camera illustrated but may be applied in any form or manner whatsoever without departing from the scope of this disclosure.

I claim:

1. In a photocomposition system for the manufacture of still, moving and television pictures, a camera, main picture projecting means and supplementary picture projecting means, a screen arranged to cooperate with both said projecting means while providing a background for a live scene occurring in front of said screen and means including a reflecting surface having a transparent cutout for taking component pictures consisting of a main picture derived from said main picture projecting means through said transparent cutout; said reflecting surface being arranged obliquely in front of said camera, while supplementary picture components derived from said supplementary picture projecting means are reflected from one side only by said reflecting surface into said camera; said camera being sharply focussed upon said main picture component and said reflecting surface being arranged so closely to the camera that the circle of diffusion measured upon the camera screen of a mirror point of less than .01 mm. is between .1 mm. and 5 mm.; optical collecting means being arranged on said one side of said mirror for directing said supplementary picture components in such a manner that these components are taken by the camera sharply at the distance given.

2. System according to claim 1 in which the reflecting surface is arranged at such a distance in front of the camera that the diameter of a diffusion circle of an optical point thereof is between .5 and 2 mm. and wherein there is a main projection screen onto which the camera is focused and onto which supplementary pictures similar to those directed from one side only upon the reflecting surface are also projected by way of background projection in such a manner that the supplementary and main pictures reflected from and passing through the mirror, respectively, supplement each other within the tolerances of the selected unsharpness without separating lines being noticeable.

3. System according to claim 1 wherein said main and supplementing projection means each include several projecting beams; there being also means for masking the areas of intersection of adjacent projecting beams.

4. System according to claim 1 comprising a projection screen and in which at least said main projecting means include several projectors arranged obliquely with respect to said projection screen; there being provided means including gray wedges for equalizing unequal illumination due to the oblique position of the projecting means.

5. System according to claim 1 comprising means for exchanging said reflecting surface with additional means reflecting from both sides thereof and supportable in place of said first reflecting surface to facilitate alignment of the reflected pictures.

6. System according to claim 1 comprising at both sides of the camera axis projectors so arranged that the optical axis of each projector intersects with the point of intersection of the optical axis of the camera on said reflecting surface; a main projection screen and means for exchanging said reflecting surface with fully reflecting means so that a complete but mirror reversed picture will be projected over said fully reflecting means upon the main projection screen; the main projecting means being adjustable upon said screen for picture coincidence and light homogeneity.

7. System according to claim 1 comprising a background projection screen; said main projection means including several projection means, at least some of said several projection means including optical means for distorting the transparencies projected therethrough to compensate at least partially any distortion caused by any oblique projection of said several projection means with respect to said main projection screen.

8. System according to claim 7 wherein said background screen is angularly adjustable to reduce distortion.

9. System according to claim 7 comprising a gray wedge attached to at least some of adjacent projection means in front thereof and in a position to cause gradual transition from one light beam into the other at areas of intersection; each gray wedge being adjustable longitudinally as well as perpendicularly.

10. System according to claim 7 comprising a collector lens and an objective in at least some of said projecting means and a gray wedge arranged in said projecting means in an unsharp zone of the light path and in a position between its collector lens and objective but between transparency and objective and close to but predeterminedly spaced from said transparency so as to permit independent adjustment of wedge and transparencies.

11. System according to claim 7 comprising gray wedges in at least some of said projecting means to cause gradual transition of adjacent light beams at areas of intersection, said gray wedges being in the general form of quarter circles of opposite curvature forming a continuous longitudinal array.

References Cited in the file of this patent

UNITED STATES PATENTS

| | | |
|---|---|---|
| 1,283,676 | Comstock | Nov. 5, 1918 |
| 1,358,110 | Presicce | Nov. 9, 1920 |
| 1,601,886 | Schufftan | Oct. 5, 1926 |
| 1,636,834 | Peters et al. | July 26, 1927 |
| 1,808,352 | Hollen | June 2, 1931 |
| 2,229,678 | Seaman | Jan. 28, 1941 |
| 2,244,687 | Goldsmith et al. | June 10, 1941 |
| 2,281,033 | Garity | Apr. 28, 1942 |
| 2,282,045 | Fleischer | May 5, 1942 |
| 2,356,694 | Potter et al. | Aug. 22, 1944 |
| 2,727,429 | Jenkins | Dec. 20, 1955 |
| 2,821,105 | Walker | Jan. 28, 1958 |

FOREIGN PATENTS

| | | |
|---|---|---|
| 186,993 | Great Britain | Oct. 9, 1922 |
| 230,454 | Great Britain | May 13, 1926 |
| 298,615 | Great Britain | Jan. 13, 1930 |
| 318,838 | Great Britain | Apr. 9, 1931 |
| 382,316 | Germany | Oct. 1, 1923 |
| 8,499 | Australia | July 26, 1927 |
| 674,753 | France | Oct. 22, 1929 |
| 768,029 | France | May 7, 1934 |